United States Patent
Huang et al.

(10) Patent No.: US 9,433,911 B2
(45) Date of Patent: Sep. 6, 2016

(54) REACTOR WITH HONEYCOMB CATALYST FOR FUEL REFORMATION

(71) Applicant: Institute of Nuclear Energy Research, Atomic Energy Council, Taoyuan (TW)

(72) Inventors: Meng-Han Huang, Taoyuan (TW); Ning-Yih Hsu, Keelung (TW); Yi-Sin Chou, New Taipei (TW); Shean-du Chiou, Taoyuan (TW); Su-Hsine Lin, Taoyuan (TW); Hwa-Yuang Tzeng, Taoyuan (TW); Ruey-Yi Lee, Taoyuan (TW)

(73) Assignee: INSTITUTE OF NUCLEAR ENERGY RESEARCH, ATOMIC ENERGY COUNCIL, LUNGTAN, TAOYUAN (TW)

( * ) Notice: Subject to any disclaimer, the term of this patent is extended or adjusted under 35 U.S.C. 154(b) by 101 days.

(21) Appl. No.: 14/614,683

(22) Filed: Feb. 5, 2015

(65) Prior Publication Data
US 2016/0228838 A1 Aug. 11, 2016

(51) Int. Cl.
*C01B 3/34* (2006.01)
*B01J 8/06* (2006.01)
*C01B 3/40* (2006.01)

(52) U.S. Cl.
CPC ............ *B01J 8/067* (2013.01); *C01B 3/40* (2013.01); *B01J 2208/00884* (2013.01); *B01J 2208/00893* (2013.01); *B01J 2208/024* (2013.01); *B01J 2208/065* (2013.01); *C01B 2203/0233* (2013.01); *C01B 2203/107* (2013.01); *C01B 2203/1023* (2013.01); *C01B 2203/1082* (2013.01); *C01B 2203/1241* (2013.01)

(58) Field of Classification Search
CPC combination set(s) only.
See application file for complete search history.

(56) References Cited

U.S. PATENT DOCUMENTS 4,340,501 A * 7/1982 Davidson ............... B01J 12/007
165/177

* cited by examiner

*Primary Examiner* — Kaity Handal
(74) *Attorney, Agent, or Firm* — Jackson IPG PLLC; Demian K. Jackson

(57) ABSTRACT

A reactor using honeycomb catalyst is provided for fuel reformation with high activity and heat stability. The reactor comprises a heating tube, a methane gas inlet, a three-way steam inlet and a hydrogen-rich gas outlet. The three-way steam inlet is near to the heating tube for providing heat required for reformation and to reduce power consumption. The heating tube is made of an inconel material so that the overall reaction may be carried out at high temperature. The heating tube is set with a honeycomb carrier of cordierite. The honeycomb carrier is pasted with carbon nanotube and heat-treated to increase internal surface area. The honeycomb carrier has a $Pt/CeO_2/\alpha\text{-}Al_2O_3$ catalyst; is placed in the heating tube; and has honeycomb-pores channels parallel to a main axis of the heating tube.

10 Claims, 2 Drawing Sheets

REACTOR WITH HONEYCOMB CATALYST FOR FUEL REFORMATION

FIELD OF THE INVENTION

The present invention relates to a reactor for fuel reformation; more particularly, relates to enhancing a conversion rate in steam reforming of a methane reactor with a simple structure, a small size, a flexible operation, and a low equipment and operating cost, where the reactor can easily be portably expanded in parallel for large-scale hydrogen production.

BACKGROUND OF THE INVENTION

In pursuit of economic growth, energy demands are dramatically increased day by day. However, available fossil fuel is dwindling. In the foreseeable future, human will face increasing energy cost and energy shortage as well as other problems. Moreover, as the regulations of environment quality are increasingly stringent and the emissions of greenhouse gases (mainly carbon dioxide) catch more and more world's attention, the needs of high-performance, new and clean energies are gradually urgent. Therein, solid oxide fuel cell (SOFC) is one of the most promising clean energies, because it has the advantages of high efficiency of power generation and low rate of carbon dioxide emission.

According to the source materials, hydrogen can be produced through reformation with natural gas, petroleum, coal and electrolytic water, where natural gas is the main source material for hydrogen production. Abundant natural gas has been reserved (about twice to the current total global reserved organic carbon of fossil fuel) so that they are likely to become the most important energy resource in 21st century. For now, all countries in the world scramble in researching and developing hydrogen energies produced with natural gas for obtaining a place in grasping enough energy in the future. Therein, the main component of natural gas is methane ($CH_4$), whose content is about 85~95 percents and methane is the hydrocarbon having the highest hydrogen ratio. Thus, methane can produce the highest ratio of hydrogen.

However, the traditional hydrogen production by steam reformation is complex and takes space. Hence, the complexity of the equipment needs to be simplified and catalyst performance has to be improved. When reactions are processed at high temperature by a reformer with nickel-based catalyst granules filled, there are problems occurred, like big pressure drop, poor thermal conductivity, catalyst granules easily broken owing to thermal stress impact, etc. Moreover, carbon deposition will cover activity center of catalyst surface and block channels, where the catalyst may even be powdered to further affect power generation of the fuel cell. Rostrup-Nielsen and Hansen studied carbon deposition ratios of different metal catalysts (Rostrup-Nielsen, J R, Hansen, J H B, J. Catal. 144 (1993) 38). After the reaction of $CH_4/H_2=95/5$, the carbon deposition results were obtained by measuring through thermogravimetric analysis (TGA) as shown in FIG. 2, where serious carbon depositions by nickel were confirmed.

A prior art revealed in 2003 used a hydrogen-rich gas as a fuel for SOFC after hydrogen was produced by steam reformation with natural gas. Another prior art of a methane reformer for SOFC used nickel-based granules with a carrier of γ-alumina oxide (γ-$Al_2O_3$) to produce hydrogen by steam reformation. Yet, carbon deposition would appear; the catalyst might be powdered after the steam reformation; the hydrogen-rich gas produced at back end could cause pulse voltage drop with current instability; and, even more, catalyst dust and carbon deposits would pollute SOFC through gas pipelines and cause system crash.

Hence, the prior arts do not fulfill all users' requests on actual use.

SUMMARY OF THE INVENTION

The main purpose of the present invention is to provide a fuel reformation reactor having a reduced bed pressure, a high catalyst activity and a high mass transfer efficiency for reaction having high space velocity of gas, where the problems of big bed pressure drop and bad thermal conductivity are solved; the problem that catalyst particles may be easily broken owing to the impact of thermal stress is solved; the reactor has a simple structure, a small size, a flexible operation and a low equipment and operation cost; a plurality of the reactors can be paralleled for expansion; and the present invention is suitable for generating hydrogen through methane reformation.

To achieve the above purpose, the present invention is a reactor with honeycomb catalyst for fuel reformation, comprising a heating tube, a methane gas inlet, a three-way steam inlet and a hydrogen-rich gas outlet, where the heating tube processes fuel reformation to obtain a hydrogen-rich gas; the heating tube has a catalyst bed and the catalyst bed comprises a honeycomb carrier and a Pt/$CeO_2$/α-$Al_2O_3$ catalyst; the honeycomb carrier comprises at least one honeycomb-pores channel parallel to a main axis of the heating tube; the Pt/$CeO_2$/α-$Al_2O_3$ catalyst is pasted on a surface of the honeycomb carrier and a surface of the honeycomb-pores channel; the methane gas inlet is located at an end of the heating tube; the methane gas inlet guides a methane gas to enter; the three-way steam inlet is located between the heating tube and the methane gas inlet; the three-way steam inlet supplies heat required to process fuel reformation; the hydrogen-rich gas outlet is located at another end of the heating tube; and the hydrogen-rich gas outlet outputs the hydrogen-rich gas obtained through reformation from the heating tube.

BRIEF DESCRIPTION OF THE DRAWINGS

The present invention will be better understood from the following detailed description of the preferred embodiment according to the present invention, taken in conjunction with the accompanying drawings, in which.

DESCRIPTION OF THE PREFERRED EMBODIMENT

The following description of the preferred embodiment is provided to understand the features and the structures of the present invention.

Figure 1:
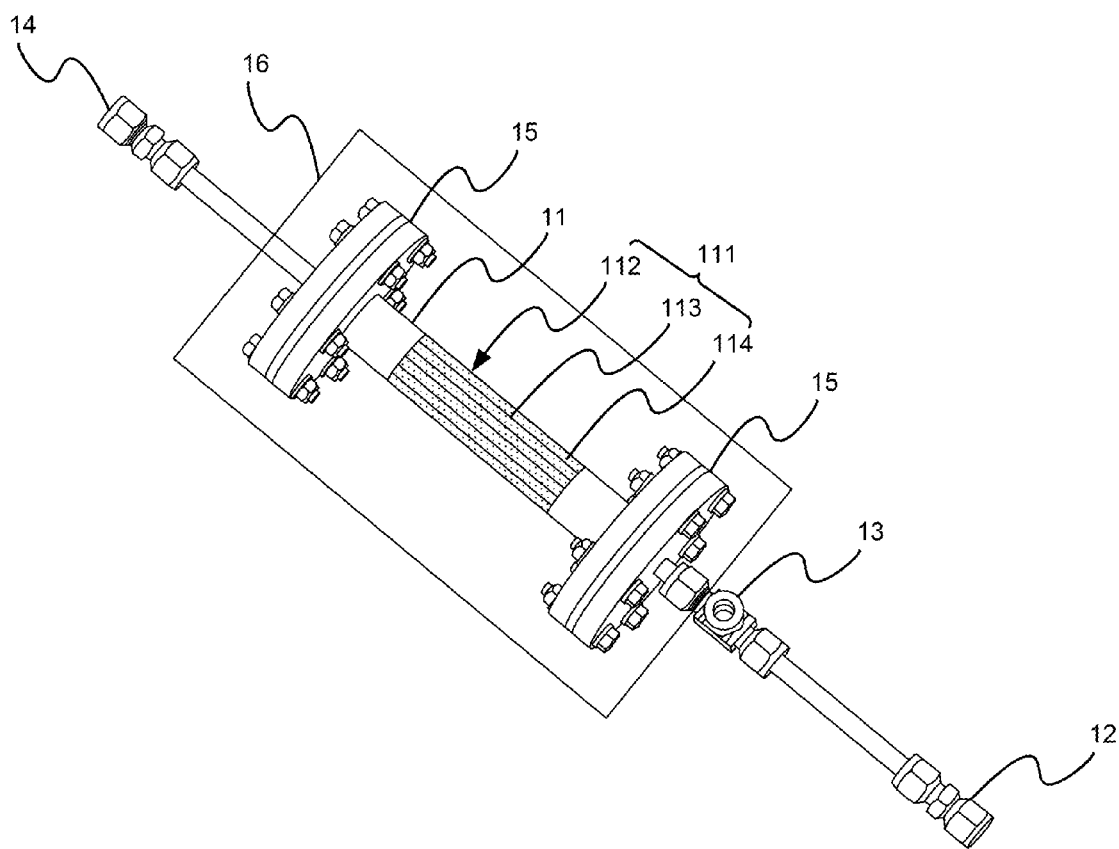
FIG. 1 is the structural view showing the preferred embodiment according to the present invention.
Figure 2:
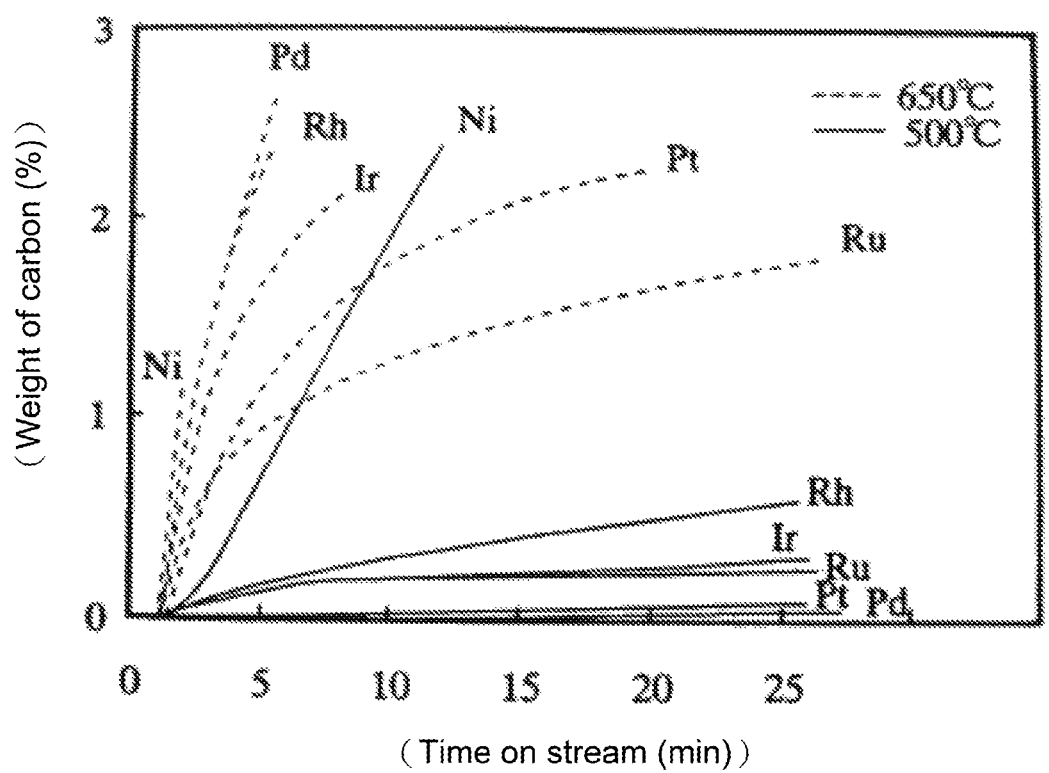
FIG. 2 is the view showing the carbon deposition rates of the different metal catalysts.

Please refer to FIG. 1 and FIG. 2, which are a structural view showing a preferred embodiment according to the present invention; and a view showing carbon deposition rates of different metal catalysts. As shown in the figures, the present invention is a reactor with honeycomb catalyst for fuel reformation, comprising a heating tube 11, a methane gas inlet 12, a three-way steam inlet 13 and a hydrogen-rich gas outlet 14.

The heating tube 11 has a catalyst bed 111. The catalyst bed 111 comprises a honeycomb carrier 112 and a $Pt/CeO_2/\alpha\text{-}Al_2O_3$ catalyst 114. The honeycomb carrier 112 comprises at least one honeycomb-pores channel 113 parallel to a main axis of the heating tube 11, where the honeycomb-pores channel 113 is a straight tube with uniformity and regularity and has 200~400 cpsi of pores. The $Pt/CeO_2/\alpha\text{-}Al_2O_3$ catalyst 114 is coated on surface of the honeycomb carrier 112 and surface of the honeycomb-pores channel 113. The heating tube 11 is made of an inconel alloy, which can be Inconel 600 or Inconel 601.

The methane gas inlet 12 is located at a lower end of the heating tube 11 for guiding a methane gas to enter.

The three-way steam inlet 13 is set between the heating tube 11 and the methane gas inlet 12 for providing required heat of reformation.

The hydrogen-rich gas outlet 14 is set at an upper end of the heating tube 11 to output a reformed hydrogen-rich gas.

A dismountable flange 15 is set between the heating tube 11 and the methane gas inlet 12 and between the heating tube 11 and the hydrogen-rich gas outlet 14. The heating tube 11 is set in a chamber 16 having temperature heated up. The chamber 16 is a high-temperature furnace, an electric stove or a microwave oven for heated up the temperature of the heating tube to 720~880 celsius degrees (° C.).

Thus, a novel reactor with honeycomb catalyst for fuel reformation is obtained.

The present invention uses the honeycomb carrier 112 made of high-temperature and low-expansion cordierite to be pasted with carbon nanotube and heat-treated for increasing internal surface area. The $Pt/CeO_2/\alpha\text{-}Al_2O_3$ catalyst 114 is coated on surface of the honeycomb carrier 112 and surface 112 of the honeycomb-pores channel 113, where a catalytic reaction occurs on the coating with small pressure drop, big reaction area and high mechanical strength for enhancing the methane conversion rate and the hydrogen yield in steam reforming of a methane reactor to help building an industrial conversion platform. Besides, because more emphasis have been put on fuel cells and new-generation car engines nowadays, the present invention appeals to use distributed on-site hydrogen producers to directly produce hydrogen at the user ends. In the present invention, the three-way water inlet 13 as being near to the heating tube 11 can provide required heat of reformation; and, by using an inconel alloy (Inconel 600 or Inconel 601) to make the heating tube 11, the overall reaction can be carried out at high temperature. The heating tube 11 is equipped with the $Pt/CeO_2/\alpha\text{-}Al_2O_3$ catalyst 114 which is located on the honeycomb carrier 112 and placed in the heating tube 11. The honeycomb carrier 112 has the honeycomb-pores channels 113 parallel to a main axis of the heating tube 11, where each of the honeycomb-pores channels 113 is a straight tube with uniformity and regularity and has 400 cpsi of pores. The front end and the rear end of the heating tube 11 have the dismountable flanges 15 to ensure air tightness, and, if necessary, to replace the catalyst bed 111 by opening the reactor. Thus, the present invention has a simple structure, a small size, a flexible operation and a low equipment and operating cost, while a plurality of the reactors can be paralleled for expansion.

Hence, the present invention is a fuel reformation reactor, which is used in a solid oxide fuel cell (SOFC) power generator and has a reduced bed pressure, a high catalyst activity and a high mass transfer efficiency for the reaction having a high space velocity of gas. The present invention solves the problems of big bed pressure drop and bad thermal conductivity and the problem that catalyst particles may be easily broken owing to the impact of thermal stress. The present invention achieves not only high efficiency of fuel reformation but also wearability of reformation reactor as well as operation durability of catalyst. Therefore, the present invention is suitable for producing hydrogen through methane reformation.

To sum up, the present invention is a reactor with honeycomb catalyst for fuel reformation, where the present invention has advantages of a reduced bed pressure, a high catalyst activity and a high mass transfer efficiency for reaction having high space velocity of gas; the present invention solves the problems of big bed pressure drop and bad thermal conductivity and the problem that catalyst particles may be easily broken owing to the impact of thermal stress; the present invention achieves not only high efficiency of fuel reformation but also wearability of reformation reactor as well as operation durability of catalyst; and, thus, the present invention is suitable for generating hydrogen through methane reformation.

The preferred embodiment herein disclosed is not intended to unnecessarily limit the scope of the invention. Therefore, simple modifications or variations belonging to the equivalent of the scope of the claims and the instructions disclosed herein for a patent are all within the scope of the present invention.

What is claimed is:

1. A reactor with honeycomb catalyst for fuel reformation, comprising:
   a heating tube, said heating tube processing fuel reformation to obtain a hydrogen-rich gas, said heating tube having a catalyst bed, said catalyst bed comprising
   a honeycomb carrier, said honeycomb carrier comprising at least one honeycomb-pores channel parallel to a main axis of said heating tube; and
   a $Pt/CeO_2/\alpha\text{-}Al_2O_3$ catalyst, said $Pt/CeO_2/\alpha\text{-}Al_2O_3$ catalyst being located on surface of said honeycomb carrier and surface of said honeycomb-pores channel;
   a methane gas inlet, said methane gas inlet being located at an end of said heating tube, said methane gas inlet guiding a methane gas to enter;
   a three-way steam inlet, said three-way steam inlet being located between said heating tube and said methane gas inlet, said three-way steam inlet supplying heat required to process fuel reformation; and
   a hydrogen-rich gas outlet, said hydrogen-rich gas outlet being located at another end of said heating tube, said hydrogen-rich gas outlet outputting said hydrogen-rich gas obtained from said heating tube.

2. The reactor according to claim 1,
   wherein said heating tube is made of an inconel alloy and said inconel alloy is selected from a group consisting of Inconel 600 and Inconel 601.

3. The reactor according to claim 1,
   wherein a dismountable flange is located between said heating tube and said methane gas inlet and between said heating tube and said hydrogen-rich gas outlet.

4. The reactor according to claim 1,
   wherein said heating tube is located in a chamber having temperature heated up.

5. The reactor according to claim 4,
   wherein said chamber is selected from a group consisting of a high-temperature furnace, an electric stove and a microwave oven.

6. The reactor according to claim 1,
   wherein said heating tube has a temperature of 720~880° C.

7. The reactor according to claim 1,
wherein said honeycomb-pores channel is a straight tube with uniformity and regularity and said honeycomb-pores channel has 200~400 cpsi of pores.

8. The reactor according to claim 1,
wherein said honeycomb carrier is made of cordierite.

9. The reactor according to claim 1,
wherein said honeycomb carrier is pasted with carbon nanotube and heat-treated to increase internal surface area of said honeycomb carrier; and
wherein said $Pt/CeO_2/\alpha\text{-}Al_2O_3$ catalyst is coated on surface of said honeycomb carrier and surface of said honeycomb-pores channel.

10. The reactor according to claim 1,
wherein a plurality of the reactors are paralleled to be expanded.

* * * * *